US008848683B2

(12) United States Patent
Lopez et al.

(10) Patent No.: US 8,848,683 B2
(45) Date of Patent: Sep. 30, 2014

(54) METHOD OF DATA MODULATION ADAPTED TO SELECTED MODULATION ROTATIONAL ANGLE

(75) Inventors: Miguel Lopez, Solna (SE); Stefan Eriksson, Hasselby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 12/864,307

(22) PCT Filed: Nov. 11, 2008

(86) PCT No.: PCT/SE2008/051291
§ 371 (c)(1),
(2), (4) Date: Jul. 23, 2010

(87) PCT Pub. No.: WO2009/096842
PCT Pub. Date: Aug. 6, 2009

(65) Prior Publication Data
US 2010/0296597 A1    Nov. 25, 2010

Related U.S. Application Data

(60) Provisional application No. 61/039,236, filed on Mar. 25, 2008.

(30) Foreign Application Priority Data

Jan. 30, 2008  (WO) ................. PCT/SE2008/050116

(51) Int. Cl.
*H04B 7/212* (2006.01)
*H04L 5/12* (2006.01)
*H04L 27/34* (2006.01)
*H04L 27/18* (2006.01)
*H04L 1/00* (2006.01)

(52) U.S. Cl.
CPC ................. *H04L 1/0038* (2013.01); *H04L 5/12* (2013.01); *H04L 27/3444* (2013.01); *H04L 1/0003* (2013.01); *H04L 27/18* (2013.01)
USPC ............ 370/347; 370/348; 375/261; 375/267

(58) Field of Classification Search
USPC .......... 370/347, 342, 337, 348; 375/261, 347, 375/267, 308, 224
See application file for complete search history.

(56) References Cited

U.S. PATENT DOCUMENTS 4,736,170 A     4/1988  Wu et al.
5,469,112 A  *  11/1995  Lee ............................... 329/302
(Continued)

FOREIGN PATENT DOCUMENTS

CN    1473402 A    2/2004
CN    1533071 A    9/2004
(Continued)

OTHER PUBLICATIONS

3rd Genereation Partnership Project. "Multi-User Reusing-One-Slot (MUROS)." 3GPP TSG GERAN#36, GP-072027, Vancouver, Canada, Nov. 12-16, 2007.

(Continued)

*Primary Examiner* — Rasheed Gidado
(74) *Attorney, Agent, or Firm* — Coats and Bennett, PLLC

(57) ABSTRACT

In a method, modulator, transmitter and receiver, the modulator of data signals to be transmitted simultaneously to at least two receiving mobile stations in the same transmission time slot is adapted to select rotational angle of a QPSK transmission modulation, such as a hybrid α-QPSK modulation used to modulate the data signals to the at least two mobile stations in response to the capabilities of the mobile stations that share the same transmission slot.

11 Claims, 5 Drawing Sheets

(56) References Cited

U.S. PATENT DOCUMENTS

| | | |
|---|---|---|
| 6,185,259 B1 * | 2/2001 | Dent .................. 375/261 |
| 6,243,413 B1 | 6/2001 | Beukema |
| 6,385,233 B1 | 5/2002 | Berger |
| 6,421,398 B1 * | 7/2002 | McVey .................. 375/308 |
| 6,654,405 B1 | 11/2003 | McDonough |
| 6,728,228 B1 | 4/2004 | Ostman |
| 6,826,169 B1 * | 11/2004 | Nagatani et al. .............. 370/342 |
| 6,865,235 B2 | 3/2005 | Khoini-Poorfard |
| 7,944,884 B2 | 5/2011 | Chitrapu et al. |
| 8,149,727 B2 | 4/2012 | Futagi et al. |
| 2002/0037059 A1 | 3/2002 | Heegard et al. |
| 2002/0110154 A1 | 8/2002 | Odenwalder |
| 2002/0131478 A1 | 9/2002 | Somayazulu et al. |
| 2002/0168026 A1 | 11/2002 | Khoini-Poorfard |
| 2003/0099306 A1 | 5/2003 | Nilsson et al. |
| 2004/0013172 A1 | 1/2004 | Hashiguchi et al. |
| 2004/0114551 A1 | 6/2004 | Gavillero Martin et al. |
| 2004/0184560 A1 | 9/2004 | Shen et al. |
| 2005/0002471 A1 | 1/2005 | Tramm et al. |
| 2005/0084044 A1 | 4/2005 | Kokkonen |
| 2005/0152473 A1 * | 7/2005 | Maltsev et al. ............... 375/299 |
| 2005/0254600 A1 * | 11/2005 | Chen et al. .................. 375/324 |
| 2007/0070968 A1 | 3/2007 | Kawasaki |
| 2007/0195907 A1 * | 8/2007 | Wang et al. .................. 375/267 |
| 2007/0268977 A1 * | 11/2007 | Wang et al. .................. 375/261 |
| 2008/0159246 A1 * | 7/2008 | Niemela .................. 370/339 |
| 2008/0240151 A1 | 10/2008 | Chitrapu et al. |
| 2009/0201880 A1 * | 8/2009 | Aghili et al. .................. 370/331 |
| 2010/0157833 A1 | 6/2010 | Vrcelj et al. |
| 2010/0208716 A1 * | 8/2010 | Mujtaba et al. ............... 370/342 |
| 2011/0077017 A1 * | 3/2011 | Yu et al. .................. 455/452.1 |

FOREIGN PATENT DOCUMENTS

| | | |
|---|---|---|
| CN | 101005303 A | 7/2007 |
| EP | 1037437 A2 | 9/2000 |
| JP | H11122312 A | 4/1999 |
| JP | 2007096740 A | 4/2007 |
| WO | 2007037412 A1 | 4/2007 |
| WO | 2009096832 A1 | 8/2009 |

OTHER PUBLICATIONS

3rd Generation Partnership Project. "Voice Capacity Evolution with Orthogonal Sub Channels." 3GPP TSG GERAN#36, Tdoc GP-071792, Vancouver, Canada, Nov. 12-16, 2007.

Nokia, "Voice Capacity Evolution with Orthogonal Sub Channel", 3GPP TSG GERAN#33, Tdoc GP-070214, Agenda Item 6.1, 7.1.5.6, pp. 1-10, Feb. 12-16, 2007, Seoul, South Korea.

Khairy, M., "Asymmetric Modulation and Multistage Coding for Multicasting with Multi-Level Reception over Fading Channels", Military Communications Conference Proceedings, Oct. 31, 1999, pp. 92-96, Atlantic City, NJ, IEEE.

Hill, D. et al., "Carrier Detection of Unbalanced QPSK Direct Sequence Signals", Military Communications Conference Proceedings, Oct. 31, 1999,pp. 437-441, vol. 1, Atlantic City, NJ, IEEE.

* cited by examiner

US 8,848,683 B2

METHOD OF DATA MODULATION ADAPTED TO SELECTED MODULATION ROTATIONAL ANGLE

TECHNICAL FIELD

The present invention relates to a method and a device for modulation of data signals.

BACKGROUND

The rapid growth of the number of subscribers in the Global System for Mobile communication (GSM) has increased the need for increased voice capacity. To meet this need mobile network operators and telecommunication equipment manufacturers have agreed to open a new study item in the 3GPP standardization. This new study item has been named Multi Users Reusing One Slot (MUROS) and is described in GP-072027, "WID on MUROS". The basic idea is to allow two users to share the same carrier frequency and the same time slot, both in the downlink and in the uplink. There are several possible technical realizations of MUROS.

However, there is still a demand for a more efficient method and a system that enables MUROS in GSM networks.

SUMMARY

It is an object of the present invention to improve transmission of data to multiple users simultaneously, such as when transmitting data to several users reusing the same transmission slot.

This object and others are obtained by a method, modulator, transmitter and receiver where the modulator of data signals to be transmitted simultaneously at the same frequency to at least two receiving mobile stations in the same transmission time slot is adapted to select rotational angle of a modulation, in particular an α-QPSK modulation used to modulate the data signals to the at least two mobile stations in response to the capabilities of the mobile stations that share the same transmission slot.

A mobile telecommunication system comprising such a modulator can transmit data signals simultaneously to several users in the same time slot. The receiver will de-modulate the received signal accordingly.

In accordance with one embodiment the rotational angle of the modulated data signal is blind detected.

In accordance with one embodiment the rotational angle of the modulated data signal as signaled information.

In one embodiment the selection of rotational angle is based on if all receiving mobile stations are aware of the existence of sub-channels or not.

In one embodiment the modulator is adapted to employ an α-QPSK modulation scheme.

The invention also extends to a transmitter, a Base Transceiver Station and a mobile station adapted to transmit data in accordance with the above principles.

The modulation increases the coverage in the downlink channel. It also makes possible the use of higher transmitter power and therefore can help increase the capacity of the network in interference limited scenarios. In addition as legacy mobiles stations are replaced by newer α-QPSK-aware mobile stations, the overall network performance is improved. Moreover, the occurrence of zero crossings can be minimized or completely avoided. This reduces the linearity requirements of the transmitter and associated power amplifiers and thereby the cost of components.

BRIEF DESCRIPTION OF THE DRAWINGS

The present invention will now be described in more detail by way of non-limiting examples and with reference to the accompanying drawings, in which.

DETAILED DESCRIPTION

Figure 1:
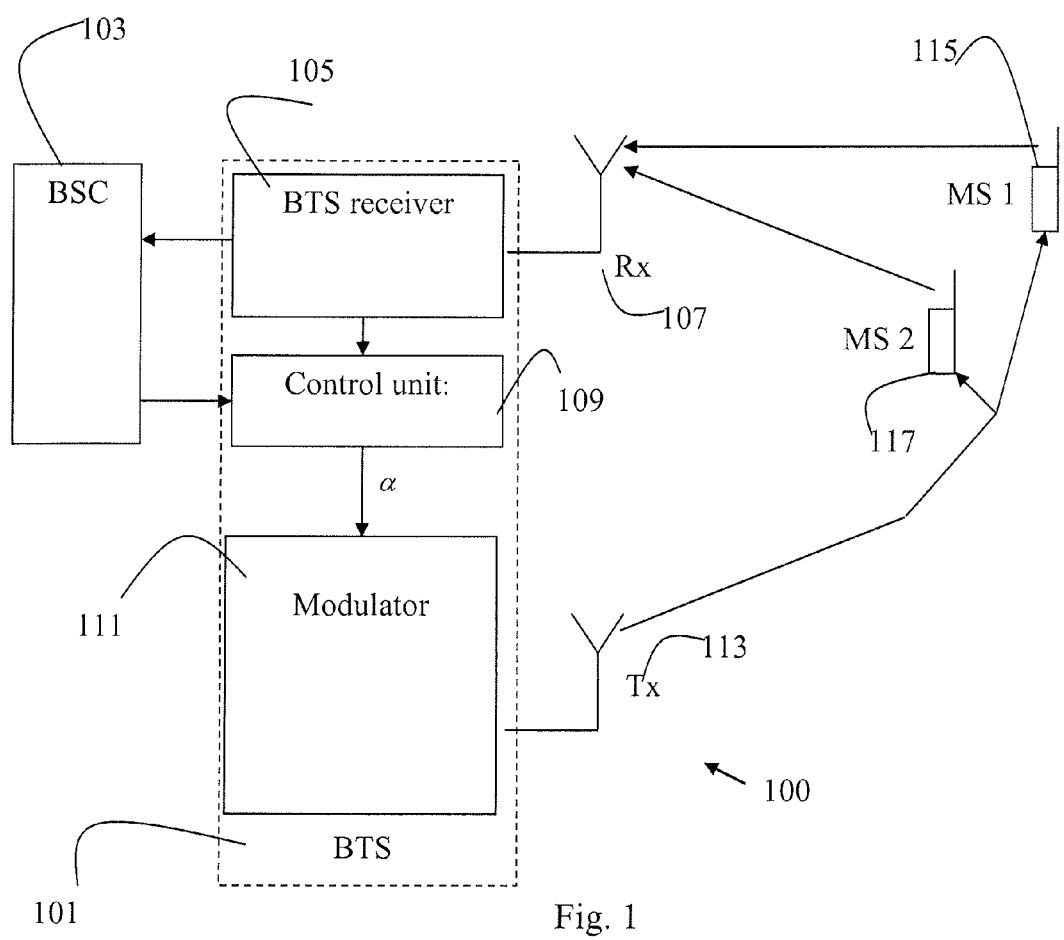
FIG. 1 is a view illustrating part of a mobile telecommunication network.

One way of providing MUROS is to use a hybrid quadrature modulation in the Downlink channel. The two user signals are mapped to the real and imaginary parts of the baseband signal. These are called the I and Q sub-channels, and under some conditions they are orthogonal. By modulating data transmitted using a Quadrature Phase Shift Keying QPSK modulation scheme in a cellular radio system to two mobile stations multiplexed on a shared channel comprising two branches, such that the total energy of the modulated signal is divided unequally between the two branches of the modulated signal an improved radio system can be obtained.

Hence, in the downlink channel a parameterized, hybrid quadrature modulation is employed. In the hybrid quadrature modulation, the symbol constellation is in quadrature, with the 4 symbols lying on the unit circle in the complex plane. The orthogonality of the I and Q branches is preserved. However, a cross power branch ratio parameter α is introduced, allowing the total energy of the signal to be divided unequally between the two sub channels. This parameter α may be changed from over time. The parameter may for example be changed from one transmission time slot to the next transmission time slot. It can be chosen so that $0 \leq \alpha \leq 1$. In case α=1 the power is divided equally between the I/Q branches, resulting in ordinary QPSK modulation. When α=0 all the signal power is given to one of the branches yielding BPSK modulation. Other values of α causes intermediate distributions of the total energy between the I and Q sub channels. In accordance with one embodiment, the parameter α can be chosen adaptively, for example based upon feedback from one or both mobile stations receiving data via the shared downlink channel, or using a fixed scheme.

The modulation using a hybrid quadrature modulation employs a time varying signal constellation is called adaptive α-QPSK. This quadrature constellation is parameterized by a real-valued parameter α. This parameter defines the shape of the signal constellation, and it can change from burst to burst. Thus, in theory, there could be an infinite number of different signal constellations.

In order to have backward-compatibility with legacy GSM mobile stations, a signal constellation that rotates by π/2 can be used.

However, on the other hand, for certain values of α, this rotation angle may result in a baseband signal with undesirable properties such as high PAR (Peak to Average Ratio) and zero crossings.

For example, in the case α=1, which corresponds to ordinary QPSK, rotation by π/2 produces the highest PAR of all possible rotations. In other words, π/2 is the least desirable among all rotation angles in this example. Typical Power Amplifiers are peak limited, which for a signal with high PAR requires additional power backoff. Hence, as a result of this when the PAR increases, the coverage of the Base Transceiver Station (BTS) decreases.

The hybrid quadrature modulation in the downlink channel employs a time varying signal constellation parameterized by a real-valued parameter α. It is called α-QPSK and it consists of four complex valued symbols, see table 1 below. The value of α determines how the total signal power is distributed between the real and imaginary parts of the complex-valued baseband signal.

TABLE 1

α-QPSK signal constellation $$\alpha\sqrt{\frac{1}{2}} + j\sqrt{2-\alpha^2}\sqrt{\frac{1}{2}}$$

$$\alpha\sqrt{\frac{1}{2}} - j\sqrt{2-\alpha^2}\sqrt{\frac{1}{2}}$$

$$-\alpha\sqrt{\frac{1}{2}} + j\sqrt{2-\alpha^2}\sqrt{\frac{1}{2}}$$

$$-\alpha\sqrt{\frac{1}{2}} - j\sqrt{2-\alpha^2}\sqrt{\frac{1}{2}}$$

For every value of α a rotation angle rot(α) that yields low a PAR is chosen. If there is a legacy mobile in at least one of the sub-channels then the BTS modulator rotates the signal by π/2. However, if there are two α-QPSK-aware mobile stations (MS) in the two sub-channels, then the BTS modulator rotates the signal by rot(α).

On the receiver side, the mobile station can be adapted to perform blind detection of the rotation angle, among a pre-determined set of rotation angles. From Enhanced GPRS General Packet Radio Service EGPRS it is known that blind detection of rotation is possible with negligible performance loss and low computational complexity.

As an alternative, the BTS can be adapted to signal the rotation angle to the mobile station. A properly chosen rotation angle results in lower PAR. Thus, by using predefined rotation angles when two α-QPSK-aware mobile stations share the same slot the performance will increase. As a result, as the proportion of α-QPSK-aware mobile stations increases in the network, the downlink coverage will also increase. Lower PAR is also beneficial in interference limited cells, since higher transmitted power may be used when necessary.

In FIG. 1 parts of an exemplary GSM system 100 are shown The system 100 comprises a Base Transceiver Station (BTS) 101. The BTS 101 is connected to Base Station Controller (BSC) 103 controlling one or several Base Transceiver Stations. The BTS 101 comprises a receiving unit 105 for processing signals received via an antenna system 107. The BTS 101 further comprises a control unit 109 for determining a value of α. Also the BTS comprises a modulator 111 for modulating signals in accordance with an adaptive α-QPSK modulation scheme using MUROS. The modulated signals are transmitted in the same slot via a transmitter 113 to two mobile stations MS1 and MS2 simultaneously. The mobile stations MS1 and MS2 are denoted 115 and 117, respectively.

The adaptive α-QPSK modulation used by the modulator 111 uses a complex constellation consisting of the 4 symbols shown in table 1. The value of the parameter $0 \leq \alpha \leq \sqrt{2}$ is decided by the control unit 109, which can be located in the BSC 103 or the BTS 101.

Figure 2:
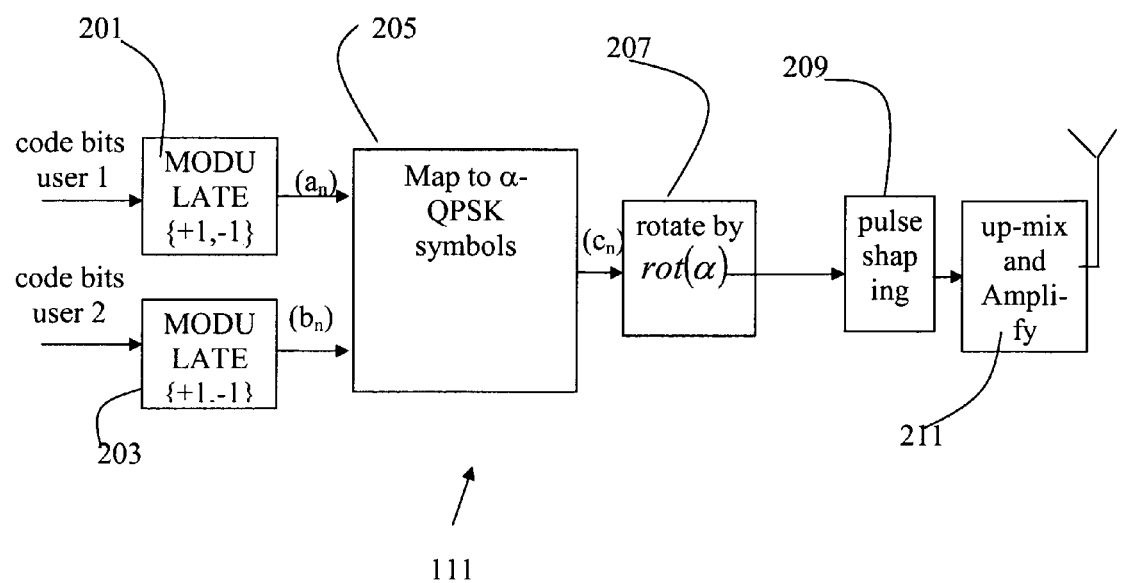
FIG. 2 is a view of a modulator for modulating data signals.

In FIG. 2 an exemplary modulator 111 and different steps performed by a modulator 111 are shown in more detail. The modulator 111 comprises initial modulators 201 and 203 for receiving and modulating to binary symbols the data sequences to be transmitted to two different mobile stations. The modulators 201 and 203 are coupled to a mapping unit 205 adapted to map the signals from the modulators 201 and 203 in accordance with an adaptive α-QPSK constellation. The adaptive α-QPSK constellation sequence formed in the unit 205 is forwarded to a rotation block 207 connected to a pulse shaping filter 209 which in turn is connected to a unit 211 adapted to mix-up and amplify the multiplexed data sequence to be transmitted to the intended receivers to the carrier frequency.

The modulator 111 may receive feedback from one or both mobile stations to which data is transmitted. In response to received feedback the modulator can be adapted to adjust α accordingly. For example α may be set to depend upon the distances from the two mobile stations to the Base Transceiver Station (BTS), the reported received signal quality (RXQUAL), or upon the capabilities of the mobile stations e.g. legacy or aware of the existence of co-channels on the same frequency and in the same time slot.

The rotation block 207 is in accordance with one embodiment implemented as follows.

Define a sequence $0 = \alpha_0 < \alpha_1 < \Lambda < \alpha_k = \sqrt{2}$, for some positive integer k, and choose rotation angles $\theta_1, \Lambda, \theta_k$. Next, let $$rot(\alpha) = \begin{cases} \pi/2 & \text{if either } MS1 \text{ or } MS2 \text{ are legacy } MS \\ \theta_m, \text{ if } \alpha_{m-1} \leq \alpha < \alpha_m & \text{and neither } MS1 \text{ nor } MS2 \text{ are legacy } MS \end{cases} \quad (1)$$

Thus, depending on the capabilities of the mobile stations that share the same transmission slot the modulator selects a rotational angle. In particular if at least one of the receiving mobile stations 115 or 117 is a legacy mobile station the rotational angle is set to π/2. If on the other hand all/both mobile stations sharing the same time slot support co-channels on the same frequency and in the same time slot, the rotational angle is set to $\theta_m$ The angles $\theta_m$, $1 \leq m \leq k$ can be chosen in such a way that if $\alpha_{n-1} \leq \alpha \leq \alpha_n$ then the signals generated rotating the α-QPSK symbol constellation by $\theta_n$ have low PAR. Optionally, the angles $\theta_m$ can also be chosen in such a way that the occurrence of zero crossings is minimized or avoided.

The α-QPSK-aware mobile stations must detect blindly the rotation angle rot(α) among the possible rotations $\theta_1, \Lambda, \theta_k$. Such blind detection schemes are for example used in EGPRS and its evolution EGPRS2. Blind detection of rotation can be achieved with virtually no performance loss and with low computational complexity.

Figure 3:
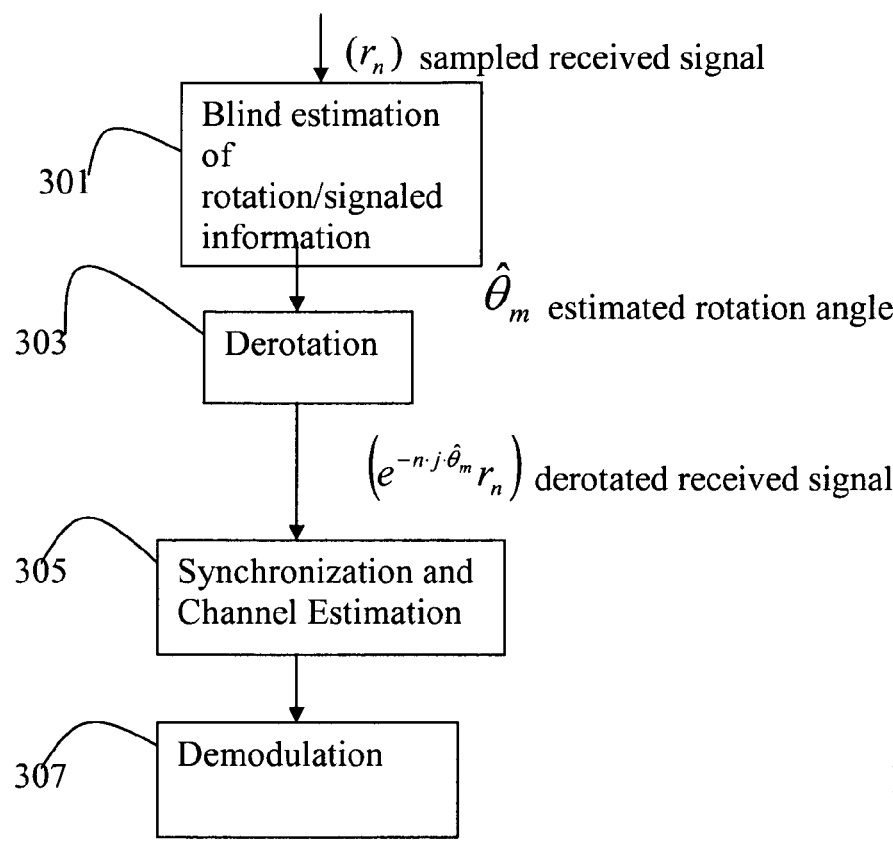
FIG. 3 is a flow chart illustrating steps performed when receiving and demodulating a data signal.

In FIG. 3 a flow chart illustrating steps performed in a mobile station aware of the existence of co-channels in the same frequency and in the same timeslot is shown. First in a step 301 blind detection of the received data signal is performed. Next, in a step 303, de-rotation of the received signal is performed based on the blind detection performed in step 301. Thereupon, is a step 305, synchronization and channel estimation is performed and the signal is then de-modulated in a step 307.

As an alternative to blind detection of the currently used rotation angle, the BTS can be adapted to signal the rotation angle to the mobile station which is then received in step 301. In this case the blind detection of rotation would not be necessary, at the cost of some additional signaling.

Below some elaborated examples illustrating the use of different rotation angles are given. Let $(\alpha_k)$ and $(\theta_m)$ be as defined in Table 2 and Table 3 respectively.

TABLE 2

| k | α |
|---|---|
| 0 | 0 |
| 1 | 0.7 |
| 2 | 1.23 |
| 3 | √2 |

TABLE 3

| m | θ |
|---|---|
| 1 | π/2 |
| 2 | π/4 |
| 3 | π/2 |

In this example only two different rotation angles are used. Therefore the implementation of blind detection of rotation in the MS has very low complexity. Alternatively, signaling of the rotation angle would require only one bit.

When the control unit 109 in FIG. 1 allows only the value $\alpha=1$, the modulator described herein can be used, together with the function rot($\alpha$) of Equation (1) with $(\alpha_k)$ and $(\theta_m)$ as defined in Table 2 and Table 3 above.

Figure 4:
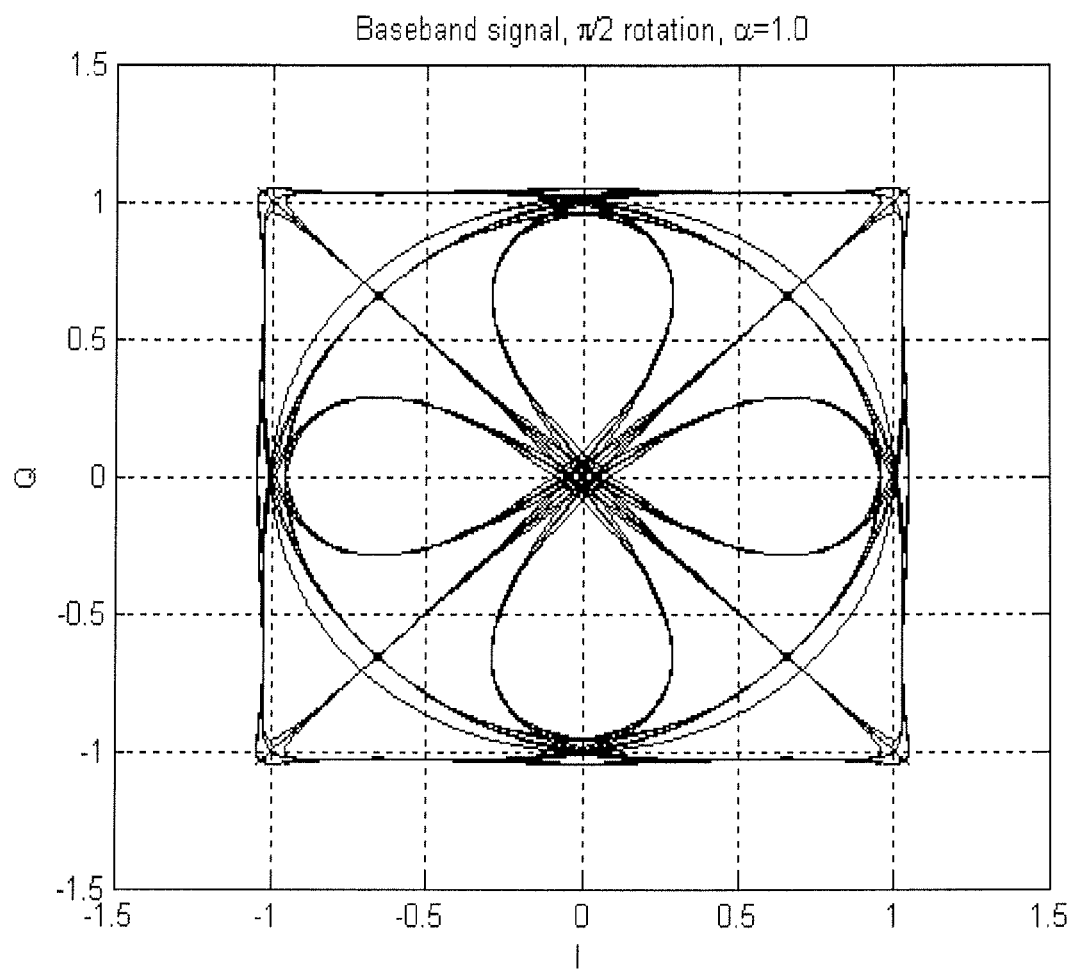
FIG. 4 is a view of transmission characteristics in accordance with a QPSK modulation scheme without selection of rotational angle.
Figure 5:
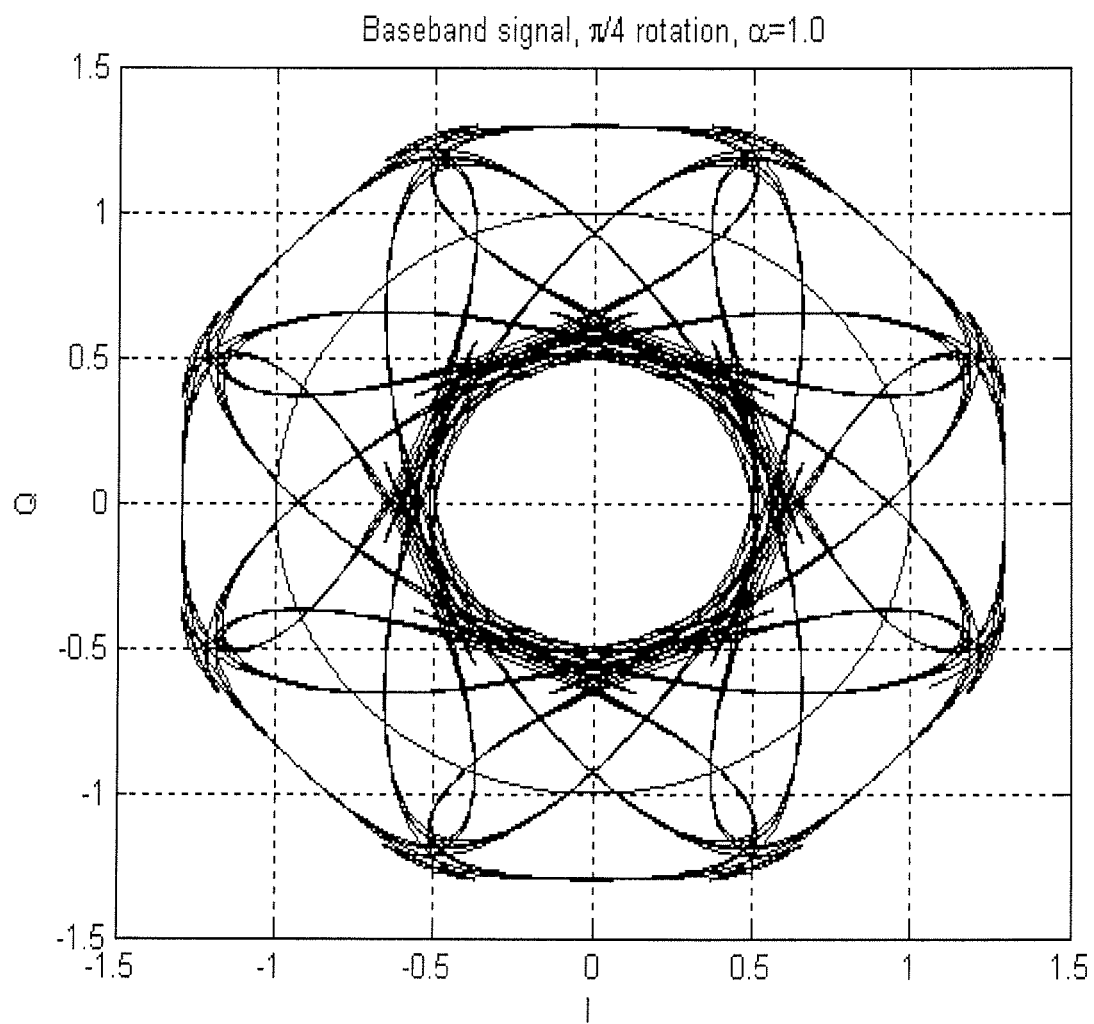
FIG. 5 is a view of transmission characteristics in accordance with a QPSK modulation scheme with selection of rotational angle.

FIG. 4 and FIG. 5 illustrate the benefit of this modulation scheme for co-channels transmitted using ordinary QPSK. In FIG. 4 the rotational angle is π/2 and in FIG. 5 the rotational angle is π/4. In both cases α is set to 1, i.e. QPSK modulation is used.

The signal shown in FIG. 5 has lower PAR than the signal shown in FIG. 4, and no zero crossings, which of course is a major advantage.

Hence, the use of a modulator adapted to select rotational angle to at least two mobile stations in the same transmission slot depending on the capabilities of the mobile stations that share the same transmission slot is not limited to a hybrid α-QPSK modulation scheme, but can be used for any QPSK modulation scheme and other modulation schemes.

Using the modulation as described herein increases the coverage in the downlink channel. In addition as legacy mobiles stations are replaced by newer mobile stations supporting awareness of the existence of two sub-channels, in particular α-QPSK-aware mobile stations, the overall network performance is improved.

The occurrence of zero crossings can be minimized or completely avoided. This reduces the linearity requirements of the transmitter and associated power amplifiers and thereby the cost of components.

The invention claimed is:

1. A method of transmitting data signals simultaneously in a wireless communication system in co-channels to at least two mobile stations at the same frequency in the same transmission time slot, comprising:
   ascertaining the capabilities of the mobile stations for detecting existence of co-channels on the same frequency and in the same time slot, said mobile stations sharing the same transmission slot;
   selecting a rotational angle of a modulation used to modulate the data signals to the at least two mobile stations in response to the ascertained reception capabilities of the mobile stations; and
   modulating the data signals using the selected rotational angle;
   wherein modulating the data signals comprises modulating the data signals using α-QPSK (Quadrature Phase Shift Keying) modulation.

2. The method of claim 1, wherein the rotational angle is set in accordance with a current value of a parameter α in α-QPSK modulation.

3. The method of claim 1, wherein the rotational angle is selected from a predetermined number of rotational angles.

4. The method of claim 1, wherein the rotational angle is set to a value corresponding to a low Peak to Average Ratio.

5. The method of claim 1, wherein the rotational angle is set to a value corresponding to one of a number of zero crossings below a predefined value, and a minimum number of zero crossings.

6. A transmitter operative in a wireless communication system and configured to transmit data signals simultaneously in co-channels to at least two mobile stations at the same frequency in the same transmission time slot, the transmitter comprising:
   a processing unit for selecting a rotational angle of a modulation used to modulate the data signals to the at least two mobile stations in response to the capabilities of the mobile stations for detecting existence of co-channels on the same frequency and in the same time slot, wherein the mobile stations share the same transmission slot, and wherein the data signals are modulated using α-QPSK (Quadrature Phase Shift Keying) modulation.

7. The transmitter of claim 6, wherein the processing unit for selecting the rotational angle is configured to set the rotational angle in accordance with a current value of a parameter α in α-QPSK modulation.

8. The transmitter of claim 6, wherein the processing unit for selecting the rotational angle is configured to select the rotational angle from a predetermined number of rotational angles.

9. The transmitter of claim 6, wherein the processing unit for selecting the rotational angle is configured to select for the rotational angle a value corresponding to a low Peak to Average Ratio.

10. The transmitter of claim 6, wherein the processing unit for selecting the rotational angle is configured to select for the rotational angle a value corresponding to one of a number of zero crossings below a predefined value, and a minimum number of zero crossings.

11. A Base Transceiver Station operative in a wireless communication system, comprising:
   a transmitter configured to transmit data signals simultaneously in co-channels to at least two mobile stations at the same frequency in the same transmission time slot, the transmitter including a first processing unit for ascertaining the capabilities of the at least two mobile stations for detecting existence of co-channels on the same frequency and in the same time slot, and a second processing unit for selecting a rotational angle of a modulation used to modulate the data signals to the at least two mobile stations in response to the capabilities of the mobile stations that share the same transmission slot, wherein the transmitter modulates the data signals using α-QPSK (Quadrature Phase Shift Keying) modulation.

\* \* \* \* \*

UNITED STATES PATENT AND TRADEMARK OFFICE
CERTIFICATE OF CORRECTION

| | | |
|---|---|---|
| PATENT NO. | : 8,848,683 B2 | Page 1 of 1 |
| APPLICATION NO. | : 12/864307 | |
| DATED | : September 30, 2014 | |
| INVENTOR(S) | : Lopez et al. | |

It is certified that error appears in the above-identified patent and that said Letters Patent is hereby corrected as shown below:

In the Specification

In Column 3, Line 54, delete "shown" and insert -- shown. --, therefor.

Signed and Sealed this
Twelfth Day of May, 2015

Michelle K. Lee
*Director of the United States Patent and Trademark Office*